(No Model.)
G. F. SIMONDS.
BALL BEARING.
No. 466,435. Patented Jan. 5, 1892.
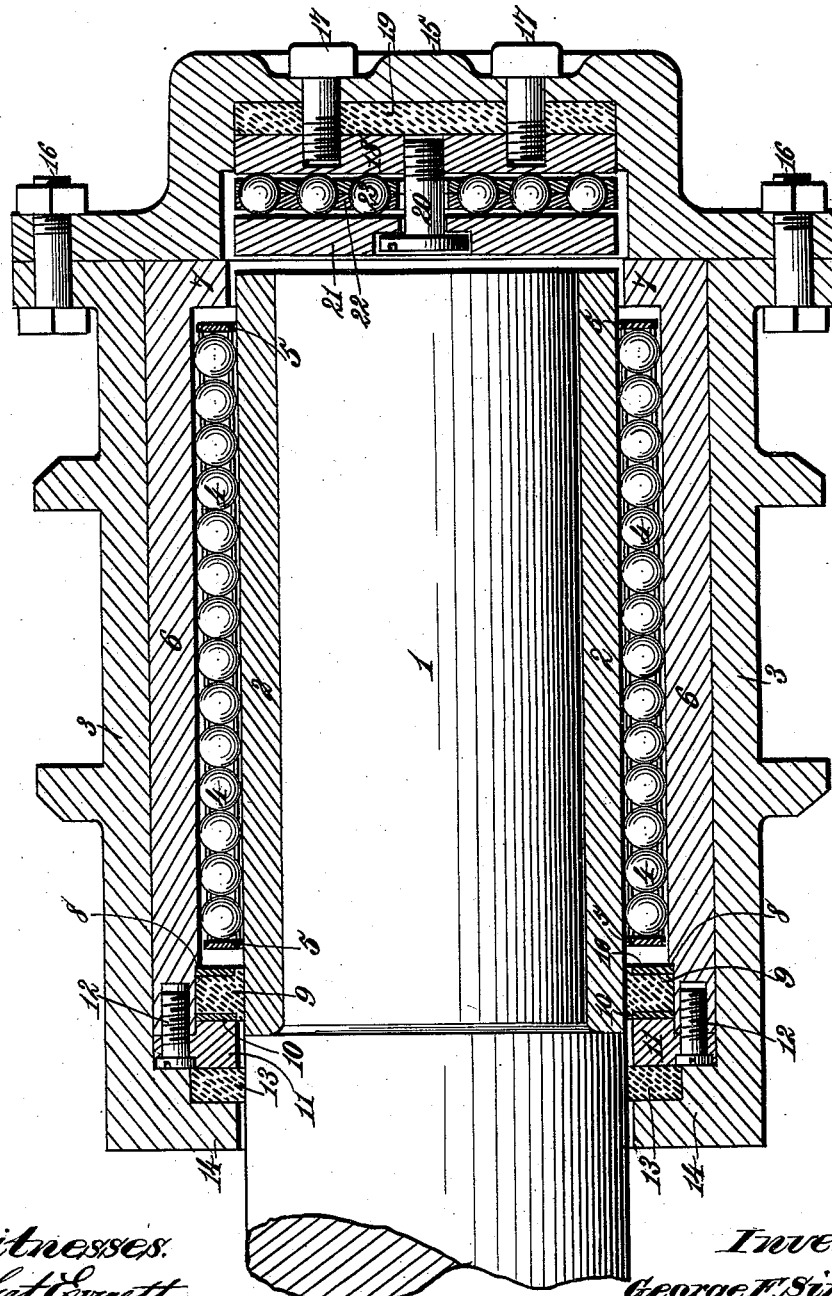
Witnesses.
Robert Everett.
J. A. Rutherford.
Inventor:
George F. Simonds,
By James L. Norris.
Atty.
THE NORRIS PETERS CO., PHOTO-LITHO., WASHINGTON, D. C.

UNITED STATES PATENT OFFICE.

GEORGE F. SIMONDS, OF FITCHBURG, MASSACHUSETTS.

BALL-BEARING.

SPECIFICATION forming part of Letters Patent No. 466,435, dated January 5, 1892.

Application filed February 24, 1891. Serial No. 382,579. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates, particularly, to a ball-bearing for sustaining the radial pressure and resisting the end-thrust of a railway-car axle.

The invention consists, first, in the combination, with a car-axle and its journal-box, of spherical rollers or balls for sustaining radial pressure and an annular ball-retaining cage surrounding the car-axle and of less length than the concentric resisting or bearing surfaces in contact with said balls, so that the said cage in which the balls are retained will be free to move longitudinally as well as rotate between the concentric bearing-surfaces and so distribute the wear uniformly; second, in the combination, with balls for resisting radial pressure, of an inclosing sleeve having at its outer end an inwardly-projecting annular flange or shoulder and provided at its inner end with an annular packing-ring and retaining devices, whereby said sleeve and inclosed cage of balls can be altogether inserted into and removed from the axle-bearing or journal-box; third, in the combination, with the car-axle, its journal-box, balls surrounding the axle to sustain radial pressure, and a cap closing the outer end of the journal-box, of balls for resisting end-thrust, a ball-retaining cage supported between two disks or hardened plane surfaces inclosed in the journal-box cap at the end of the axle, and an elastic cushion placed between the outermost disk and the inner face of the inclosing cap to obviate jar and diminish the frictional effects of end-thrust; and the invention further consists in the construction and combination of parts in a ball-bearing, as hereinafter more fully set forth.

The annexed drawing is a sectional plan of a car-axle bearing, illustrating the novel features of my invention.

In the drawing, the numeral 1 designates the car-axle spindle, which may have a hardened-metal sleeve 2 fast thereon. The axle is supported in a journal-box 3, which may be of any suitable construction. For the purpose of diminishing friction and sustaining the radial pressure of the axle a number of spherical rollers or balls 4 are confined in an annular cage 5, that is adapted to surround the axle-spindle.

The annular cage 5 is inclosed in a sleeve 6, having an inwardly-projecting flange or shoulder 7 at its outer end. Before the cage 5 and sleeve 6 are placed in position within the bearing the cage and its contained balls are inserted in the said inclosing sleeve. In the inner end of the sleeve 6, beyond the cage 5, is an internal annular shoulder or ledge 8, against which abuts a packing-ring 9, that may be faced with metal washers 10, arranged on its opposite sides. The inner end of the sleeve 6 is closed by a shouldered annular cap 11, abutting against the packing-ring 9 or outer washer 10 and secured in place by screw-bolts 12 or otherwise. By this construction the sleeve 6 and inclosed cage of balls can be inserted into and removed from the journal-box in a body without any difficulty or loss of time. It will be observed that the balls 4, which sustain radial pressure, bear only at two diametrically-opposite points against parallel concentric bearing-surfaces and that they are adapted to roll freely in all directions on and between said surfaces, so as to uniformly distribute the wear, and thereby reduce it to a minimum. When the sleeve 6 and its contents are placed in position within the bearing or journal-box, the annular cap 11 abuts against a packing ring or cushion 13, surrounding the axle and supported by a shoulder 14 in the inner end of the journal-box.

The outer end of the journal-box 3 is closed by a cap 15, secured in place by screw-bolts 16 or other suitable means. Within this cap 15 is secured by means of screw-bolts 17 a disk or hardened-steel surface 18 and an interposed elastic cushion 19, that is placed between the outer face of said disk and the inner face of the cap. In the center of the stationary disk 18 is secured a screw-bolt 20, that forms a central support for a movable disk or hardened-steel surface 21 and for an annular ball-retaining cage 22, containing a series of spherical rollers or balls 23, that project laterally from the opposite sides of said cage in position to take the end-thrust of the axle. The construction and arrangement of the cage 22 and balls 23 are the same as shown and described in an application, Serial No. 371,558, filed by me November 15, 1890, except that in the present device an elastic cushion 19 is placed between the cap and the thrust-bearing to obviate jar.

It will be observed that the cage 5, containing the balls for resisting radial pressure, is of less length than the ball-bearing surfaces of the concentric sleeves 2 and 6 or the space between the shoulder 7 and packing-ring 9, thus permitting the cage 5 to have a free movement longitudinally with the axle, as well as in a rotary direction, so that, while the balls 4 may be placed close together within the cage, they will not be compelled to move in circular paths on the bearing-surfaces; but by the movement of the cage they will have sufficient play to distribute the wear uniformly. In this construction I may provide for a longitudinal movement of the axle, so that the balls confined in the cage will be compelled to roll in contact with the whole of the bearing-surfaces. It will also be observed that all the parts of the bearing are so constructed that they can be easily disconnected and replaced and that the arrangement of the devices for sustaining radial pressure is such that by permitting the removal of the annular ball-retaining cage and its inclosing sleeve together or in one body quick and ready access is afforded for replacing the packings at the inner end of the bearing or for making any required adjustments of the several parts.

What I claim as my invention is—

1. In a ball-bearing, the combination, with an axle and its journal-box, of spherical rollers or balls adapted to revolve freely in all directions for sustaining radial pressure, and an annular ball-retaining cage surrounding the axle and adapted to have a longitudinal movement between the concentric bearing-surfaces on which the spherical rollers or balls move, substantially as described.

2. In a ball-bearing, the combination, with an axle and its journal-box, of an intermediate sleeve having a hardened bearing-surface concentric with and parallel to the hardened bearing-surface of said axle, an annular cage inclosed by said sleeve, and spherical rollers or balls retained by said cage in position to roll freely in all directions upon and between the concentric bearing-surfaces and removable in a body together with said cage and sleeve, substantially as described.

3. In a ball-bearing, the combination, with an axle, its journal-box, and a cage in which are confined spherical rollers or balls for sustaining radial pressure, of a removable sleeve in which said cage is inclosed, said sleeve having at one end an inwardly-projecting flange or shoulder and provided at its other end with an annular packing-ring, and retaining devices whereby the sleeve and inclosed cage of balls can be inserted and removed together, substantially as described.

4. In a ball-bearing, the combination, with an axle, its journal-box, and spherical rollers or balls surrounding the axle to sustain radial pressure, of an annular cage in which said balls are retained, a shouldered sleeve inclosing said cage and removable therewith, and an annular cap closing one end of said sleeve, substantially as described.

5. In a ball-bearing, the combination, with an axle, its journal-box, balls surrounding the axle to sustain radial pressure, and a cap closing the outer end of the journal-box, of two disks or hardened plane surfaces inclosed in said cap at the end of the axle, a ball-retaining cage supported between said disks and provided with a series of balls for resisting end-thrust, and an elastic cushion placed between the outermost disk and the inner face of the cap to obviate jar, substantially as described.

In testimony whereof I have hereunto set my hand and affixed my seal in presence of two subscribing witnesses.

GEORGE F. SIMONDS. [L. S.]

Witnesses:
 JAMES A. RUTHERFORD,
 GEO. W. REA.